(No Model.)   7 Sheets—Sheet 1.

F. H. RICHARDS.
WEIGHING MACHINE.

No. 589,276.   Patented Aug. 31, 1897.

Witnesses:
Frank G. Hewitt,
Fred J. Dole.

Inventor:
F. H. Richards (No Model.) 7 Sheets—Sheet 2.

F. H. RICHARDS.
WEIGHING MACHINE.

No. 589,276. Patented Aug. 31, 1897.

Witnesses:
Frank G. Hewitt
Fred. J. Dole.

Inventor:
F. H. Richards (No Model.) 7 Sheets—Sheet 5.

F. H. RICHARDS.
WEIGHING MACHINE.

No. 589,276. Patented Aug. 31, 1897.

Witnesses:
Frank G. Hewitt
Fred. J. Dole

Inventor:
F. H. Richards (No Model.)  
F. H. RICHARDS.
WEIGHING MACHINE.
No. 589,276.  Patented Aug. 31, 1897.
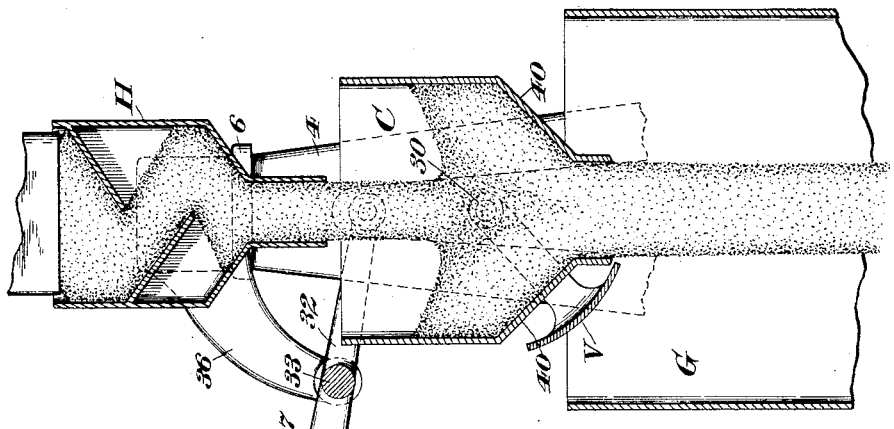
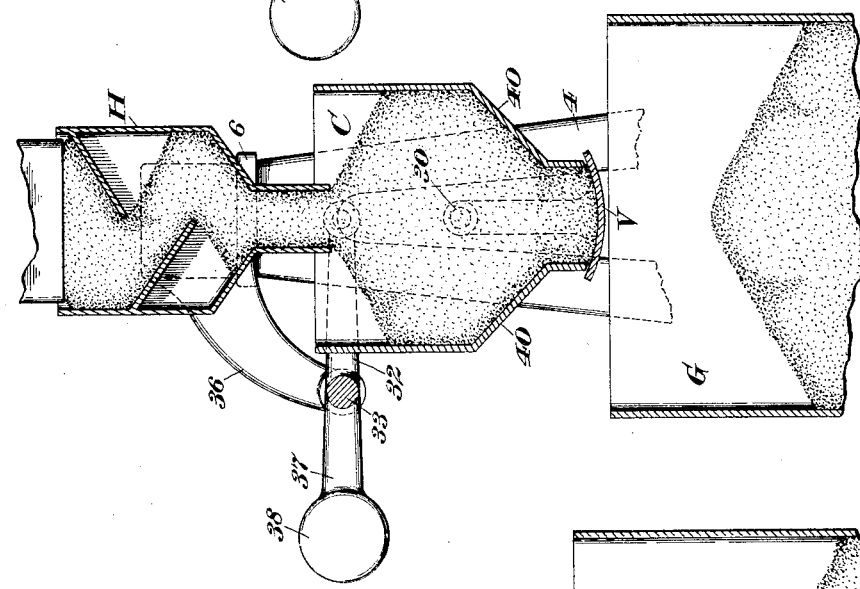
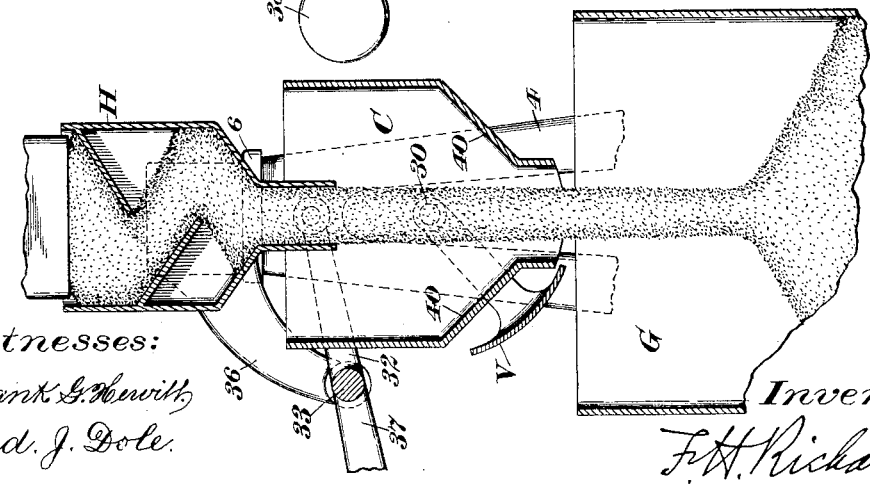
Witnesses:
Frank G. Hewitt
Fred. J. Dole.
Inventor:
F. H. Richards.

(No Model.)  7 Sheets—Sheet 7.
F. H. RICHARDS.
WEIGHING MACHINE.
No. 589,276. Patented Aug. 31, 1897.
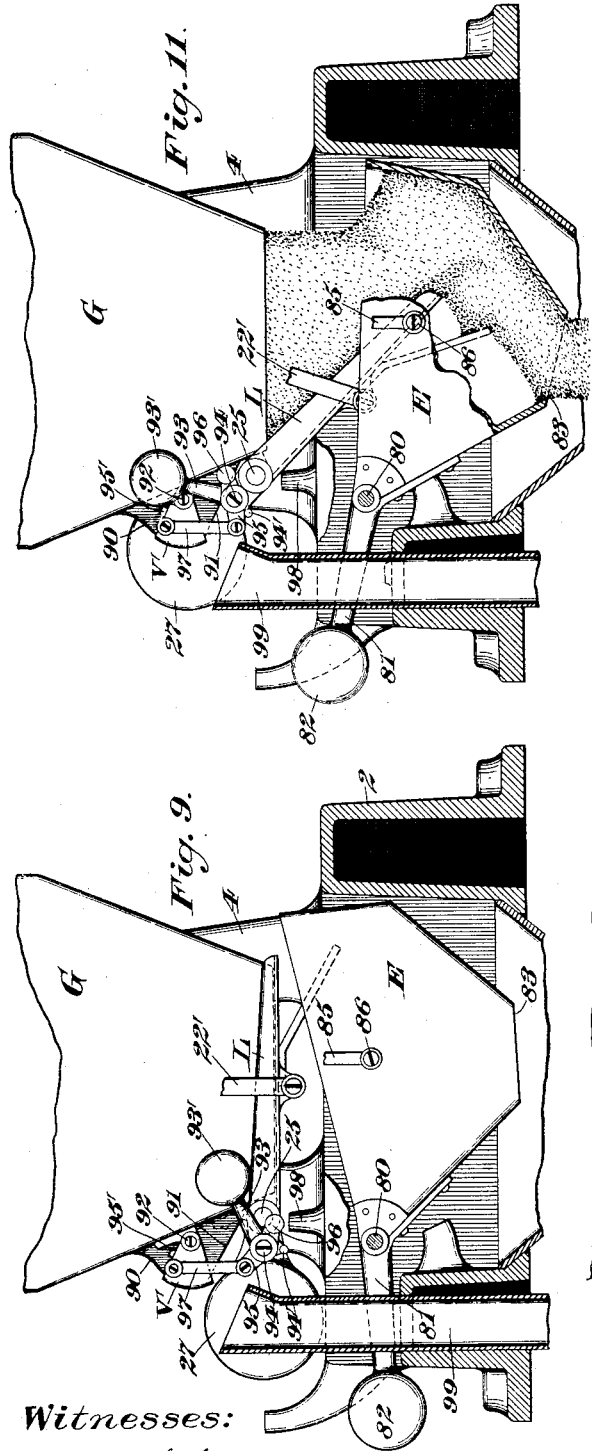
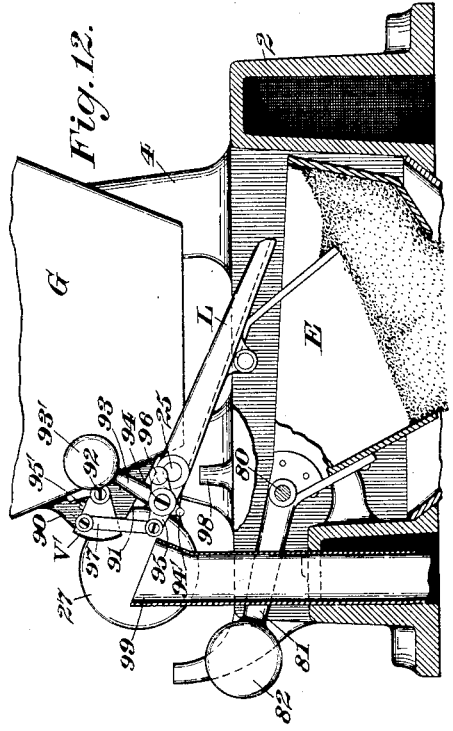
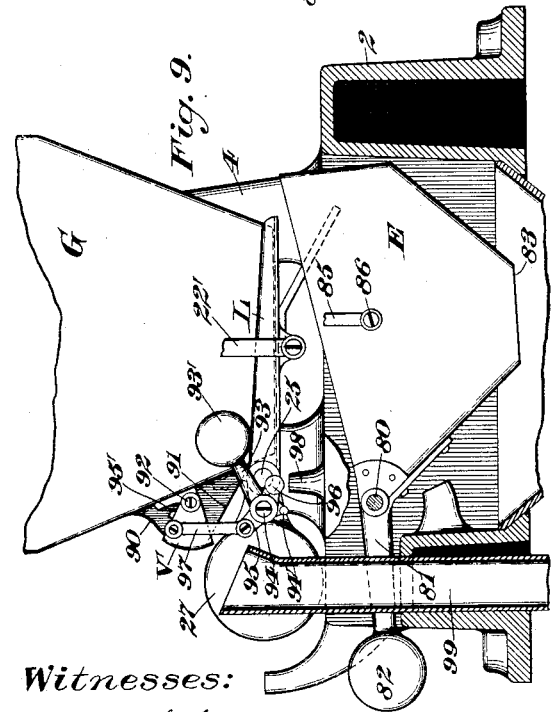
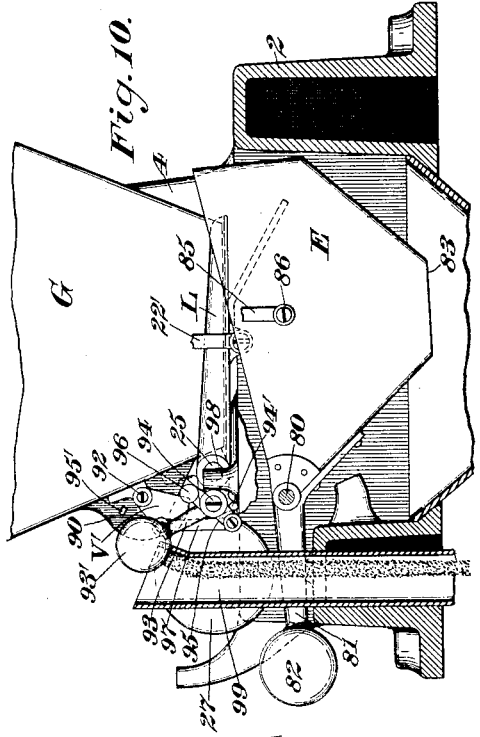
Witnesses:
Frank G. Hewitt
Fred. J. Dole.
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,276, dated August 31, 1897.

Application filed June 17, 1897. Serial No. 641,168. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved machine of this character adapted for weighing various kinds of granular and other free-flowing substances, certain of the improvements being particularly intended for application to machines of the kind disclosed by Letters Patent No. 572,067, granted to me November 24, 1896.

Figure 1:
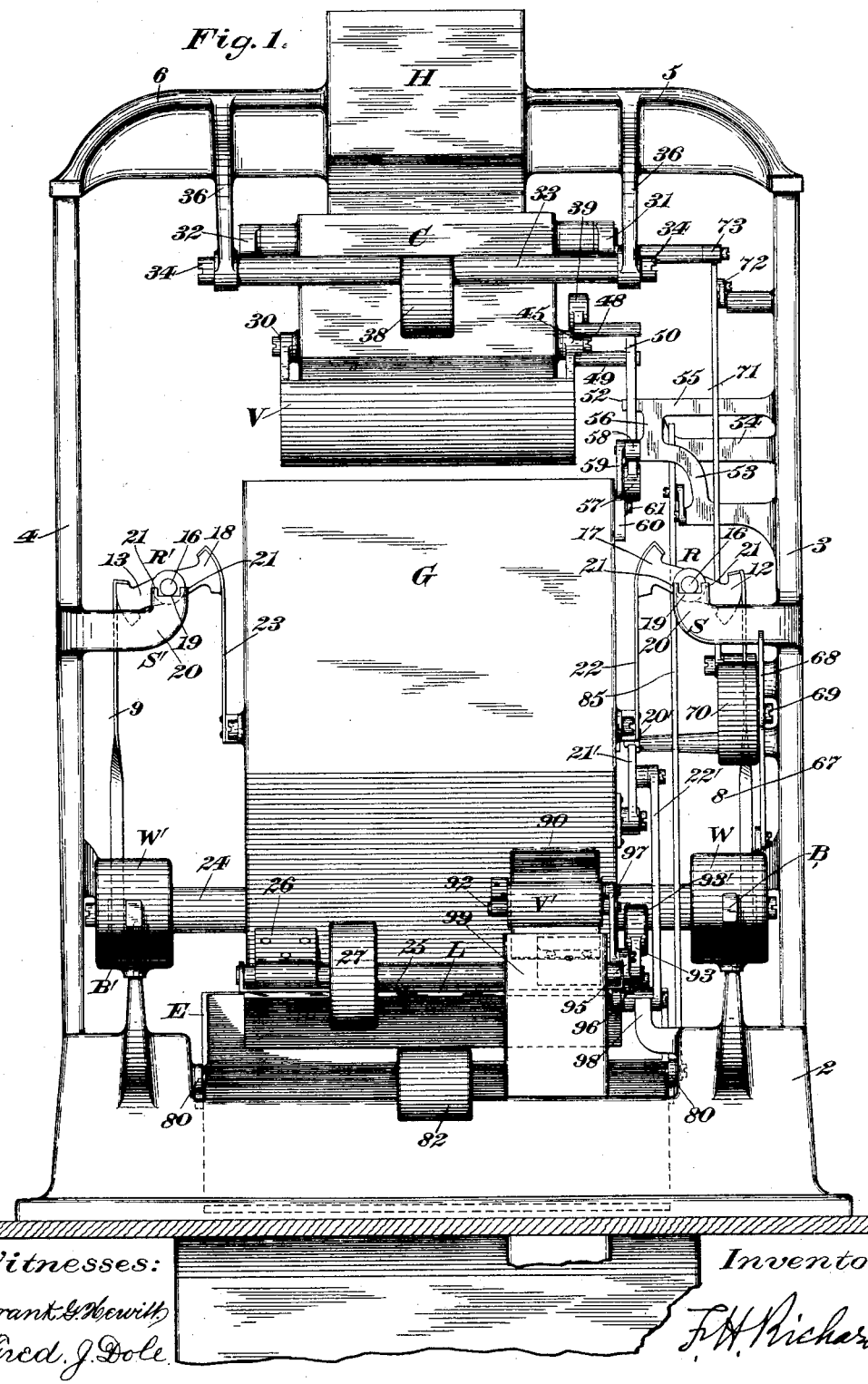

In the drawings accompanying and forming part of this specification, Figure 1 is a rear elevation of my improved machine. Figs. 2, 3, 4, and 5 are side elevations of the same as seen from the right in Fig. 1, portions being broken away and the parts being represented in the positions occupied thereby during a cycle of movements. Figs. 6, 7, and 8 are longitudinal central sections of the supply mechanism and a portion of the load-receiver. Figs. 9, 10, 11, and 12 are sectional side elevations of the lower part of the load-receiver, the regulator, and the load-reducing means in their different positions.

Similar characters designate like parts in all the figures of the drawings.

The framework for sustaining the different parts of the machine may be of any suitable or preferred character, and it is shown comprising the chambered base or bed 2, the side frames 3 and 4, and the brackets 5 and 6, which extend oppositely from the hopper H.

The weighing mechanism embodies as a part thereof a suitable load-receiver, as G, and counterpoising mechanism for the load-receiver, such as a plurality of beams B and B', said beams being preferably counterweighted and mounted at each side of the load-receiver. The beams are provided with the weights W and W' and are preferably fulcrumed against the framework, as at 7, said beams being equipped at their outer ends with knife-edge pivots working against notched bearings on the framework, the knife-edge pivots and notched bearings being of well-known construction. The two beams are connected with the load-receiver G by flexible straps, as 8 and 9, of suitable material, the straps being suitably fixed at their lower ends to lugs, as 10, extending laterally from the two beams at points between their axes of movement, and counterweights, the opposite ends of the straps being similarly fixed to the segments 12 and 13 of the rockers R and R', the axes of movement of which are transverse to the axes of movement of the two beams, said rockers being connected with the load-receiver, preferably by flexible straps, and being also mounted to travel bodily along their supports, as S and S'.

Each rocker R and R' consists of a longitudinal shaft, as 14, having journal portions, as 16, at the opposite ends and a series of oppositely-disposed segments. The outwardly-extending segment of the rocker R is designated by 12 and the oppositely-disposed segments by 17, said segments 17 being secured near the opposite ends of the shaft 14. The outwardly-disposed segment of the rocker R' is designated by 13, while the inwardly-disposed segments are designated by 18. The journal portions 16 of the two shafts 14 are adapted to roll along the flat bearing-faces 19 of the series of brackets 20, extending inward from the two side frames 3 and 4, said brackets constituting the supports S and S', to which I have previously referred, the several brackets being furnished with the stops 21 to limit the movement of the two shafts 14. The segments 17 of the rocker R on opposite ends of the shaft 14 have secured thereto the flexible straps 22, the lower ends of said straps being similarly secured to the load-receiver, the segments 18 being furnished with a similar pair of straps, as 23, secured at their lower ends to the opposite side of the load-receiver.

The forward ends of the two beams B and B' are connected by the shaft 24 to secure the simultaneous movement of said beams and of the parts connected therewith. The load-receiver G has in its lower end the usual discharge-outlet, which is preferably covered by a closer, as L, pivoted at one side of said outlet for oscillatory movement.

The closer L is secured to the shaft 25, journaled in bearings, as 26, near the lower rear end of the load-receiver and having a counterweight 27 fixed thereto, constituting a convenient means for shutting the closer on the discharge of a load. The closer is normally maintained in its shut position by a suitable detent, as the counterweighted latch 20', adapted to engage the short lever 21' on the load-receiver, which is connected to the closer L by the link 22'.

My present invention comprehends as a part thereof overloading and load-reducing means, the overloading means being adapted to supply or deliver to the load-receiver a supply of material in excess or beyond the predetermined load or charge, the surplus being subsequently removed and directed to a suitable surplus-receiver, as will hereinafter appear.

The overloading means embodies as a part thereof a suitable supply device, as C, consisting in the present instance of a hopper having two distinct stages of operation in the same direction and a device of suitable sort, such as a valve, for controlling the discharge of material from said hopper.

The supply device or hopper C is supported for vertical reciprocation, it descending in two distinct stages and it being adapted to furnish the necessary power for causing the operation of a stream-controller or valve V, pivoted to said supply device or hopper C at 30. The reciprocatory supply device or hopper C is supported at its upper end below the fixed supply-hopper H, thereby to receive a stream of material therefrom, it being carried by the forwardly-extending arms 31 and 32, pivoted at opposite sides thereof on the rock-shaft 33. The shaft 33 has bearings at its opposite ends for receiving the pivot-screws or other journals, as 34, carried by the arms 36, depending from the brackets 5 and 6, said shaft having the rearwardly-disposed counterweighted arm 37, the weight 38 of which is adapted to aid in lifting the supply device or hopper C from its lowest to its highest position.

The valve V, as hereinbefore stated, is pivoted to the reciprocatory hopper C for oscillation, it preferably being provided with a balance-weight, as 39, at one side of its axis of oscillation, so that it has no tendency to move in either direction, and but a slight expenditure of power by the hopper C is therefore necessary to operate the same.

Figure 2:
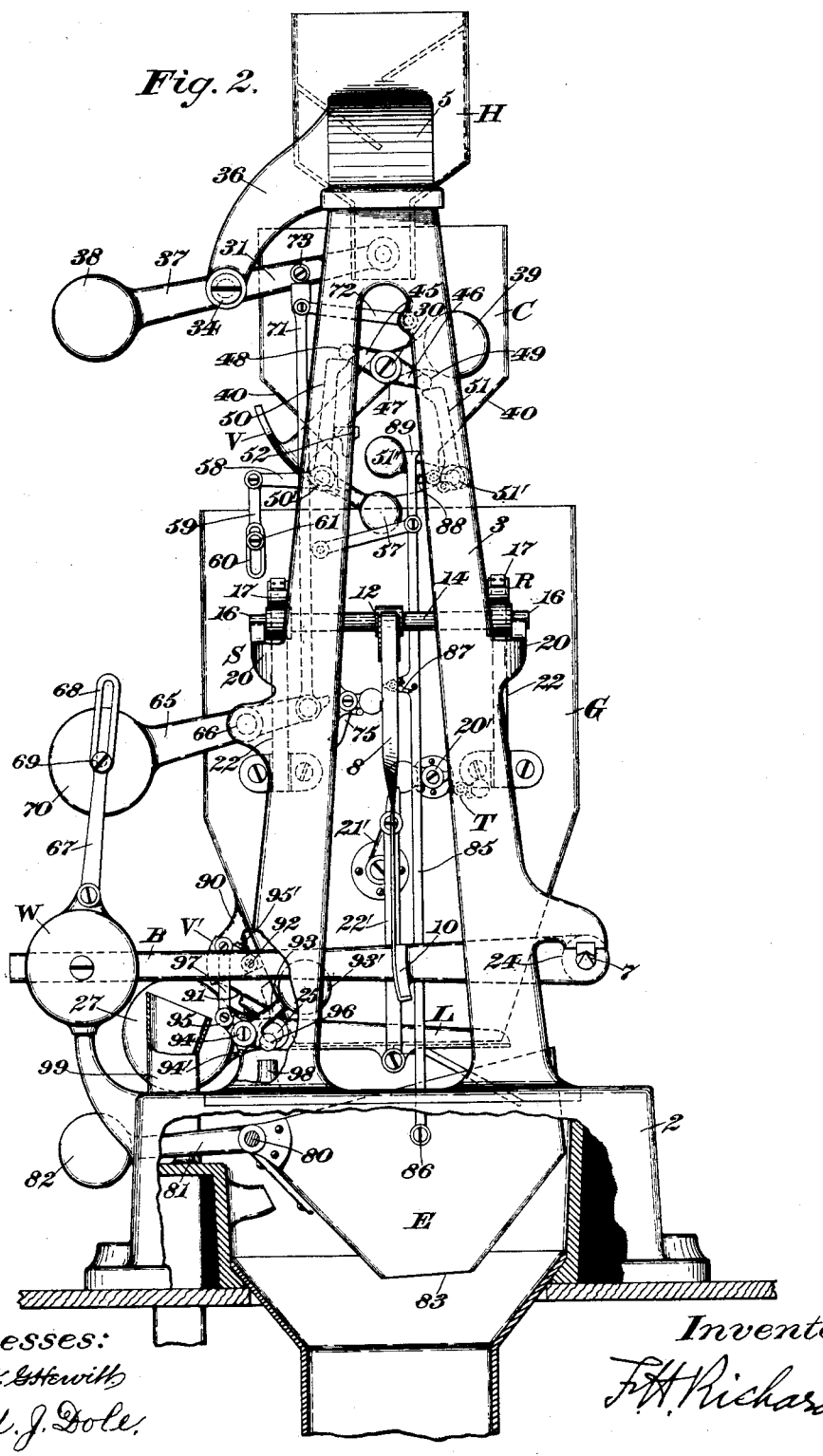
Figure 3:
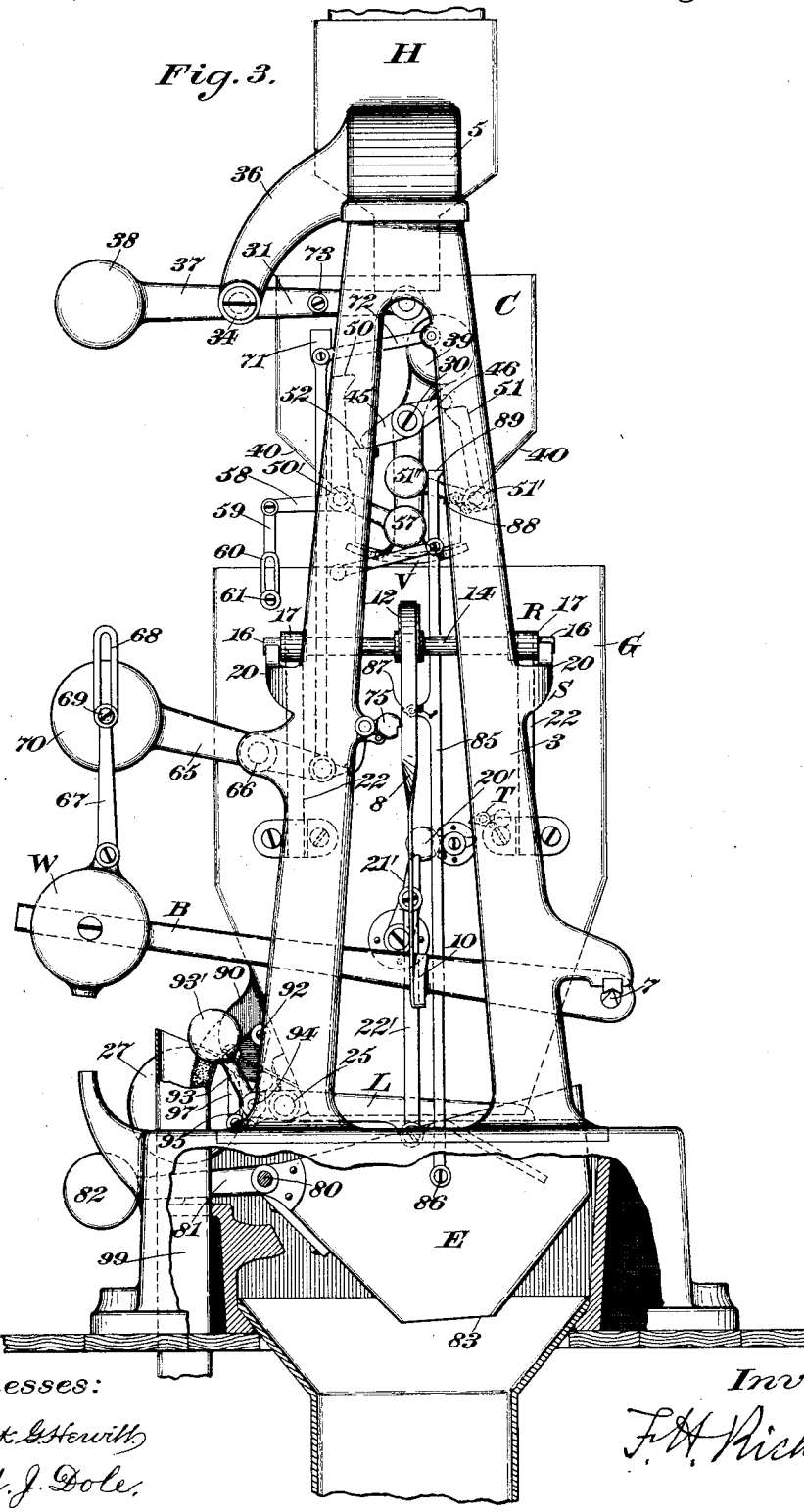
Figure 5:
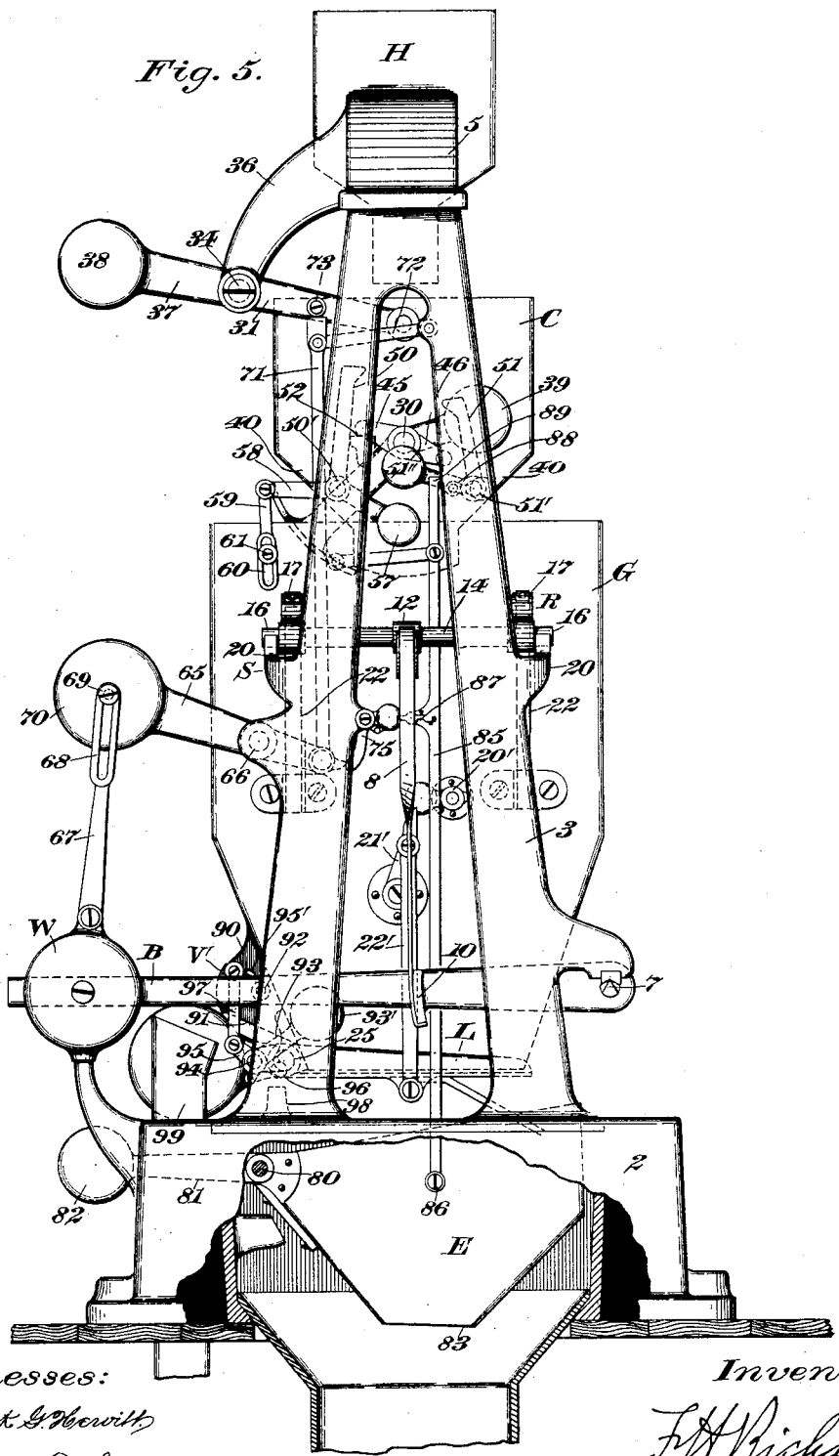

The order of operation of the reciprocatory hopper C and stream-controller or valve V is illustrated in Figs. 2, 3, and 5, the parts being shown in their two extreme positions, respectively, in Figs. 2 and 5.

Figure 4:
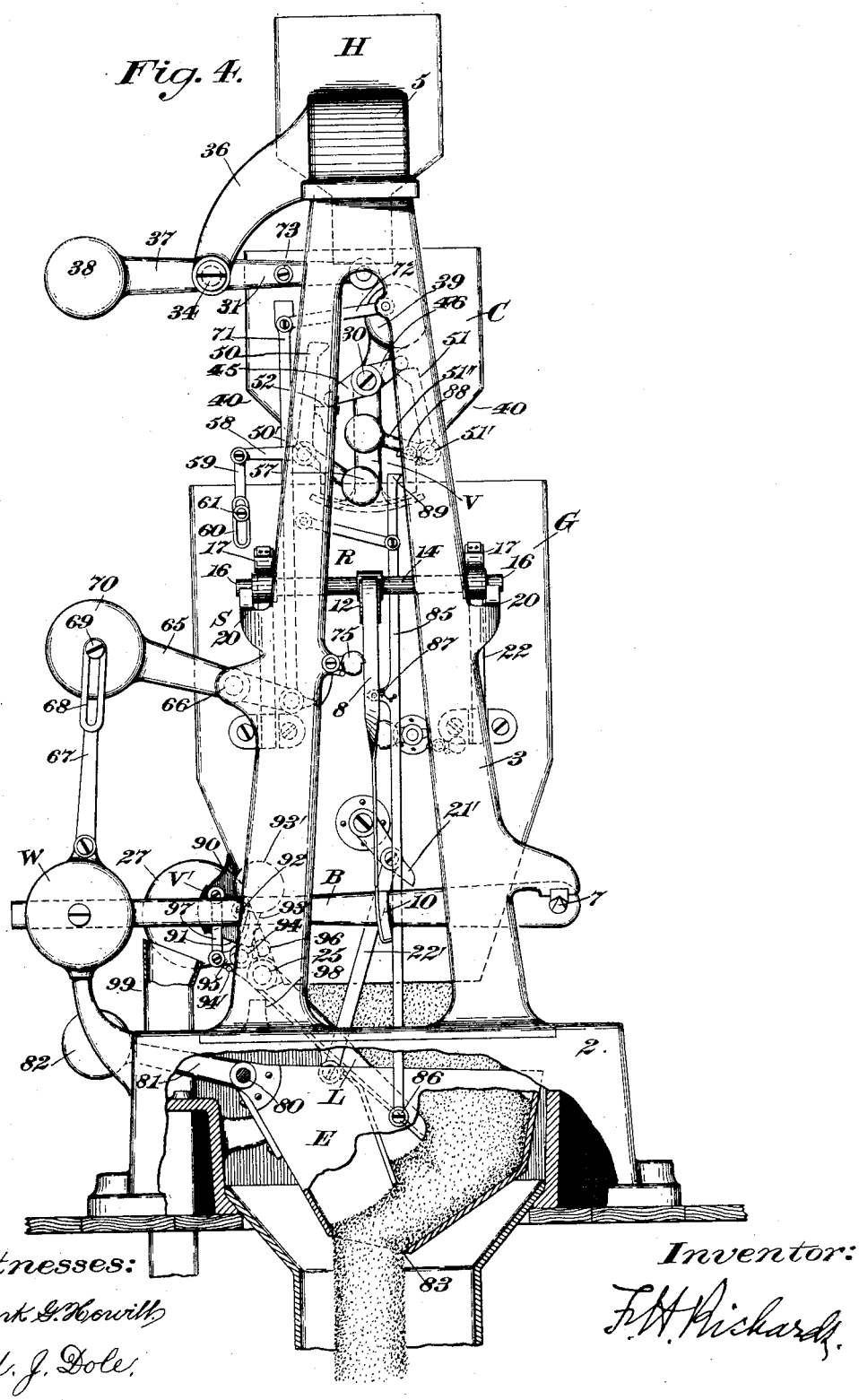

In Fig. 2 the hopper C and valve V are illustrated in their primary and highest positions, where they are maintained by a suitable detent, which, when the load-receiver G reaches the limit of its downstroke, is tripped so that said hopper is released and can drop partly by its own weight and partly by the material therein acting against the opposite inclined walls 40 thereof, the hopper on its initial movement furnishing the power to swing the valve to its shut position, as represented in Fig. 3, to stop the passage of the supply-stream to the load-receiver. During this period in the operation of the machine the surplus is removed from the load-receiver G and directed into a suitable surplus-receiver, and when the proper load remains in the receiver G it will be discharged, as shown in Fig. 4. When the valve and hopper reach their closed and intermediate positions, (represented in Fig. 3,) their further descending action will be checked momentarily by a suitable detent. When said detent is tripped, the hopper can move from its intermediate position (shown in Figs. 3 and 4) to its lowest position, (shown in Fig. 5,) and as it does so it furnishes the necessary power for again swinging the valve open, as shown in Figs. 5 and 8. When the valve is opened the second time, an accumulation of material from the hopper H will be discharged into the empty load-receiver and simultaneously therewith, through the operation of an actuator, it will be returned to its highest position to again repeat the successive operations. The valve V has at its upper end the oppositely-disposed arms 45 and 46, extending from the hub 47, said arms being furnished at their outer ends with the lateral projections 48 and 49, respectively, adapted successively to engage suitable detents, as 50, 51, and 52, disposed in alternation at opposite sides of the projections, said detents being adapted to maintain the valve and its hopper in their several shifted positions, and the detents 50 and 51 being in the form of levers designed to be tripped by connections respectively with the weighing mechanism and regulator. The detents or levers 50 and 51 are pivoted, as at 50' and 51', respectively, to the brackets 53 and 54, extending inward from the side frame 4, a third bracket 55 being connected with the bracket 53 by the cross-piece 56, the inner end of the bracket 55 constituting the detent 52, previously described. The detent 50 has its lower arm counterweighted, as at 57, and is provided with the angular arm 58, to which is pivoted the link 59, the opposite end of said link being provided with a loop 60, adapted to embrace the projection 61 near the upper end of the load-receiver. By reason of the sliding joint provided between the link and load-receiver the latter can have a certain amount of movement without affecting the link 59 and detent 50, as will be apparent.

The hopper C and valve V are represented as occupying their normal positions in Fig. 2, the projection 48 of the arm 45 being in contact with the upper end of the detent or lever 50 and the projection 61 being near the upper end of the loop 60. When the load-receiver descends, the projection will move toward the lower end of the loop and will abut against the same when the load-receiver has reached the limit of its downward movement, so that the vertical arm of the detent will be thrown from under the projection 48, whereby the valve and hopper will be released, so that the hopper is free vertically to descend, and the projection 49 being in contact with the upper end of the detent 51, which acts as a resistance device, the valve V will be swung to its closed position simultaneously with the dropping of the hopper C, as illustrated in Fig. 3. While the hopper is descending from the position shown in Fig. 2 to that illustrated in Fig. 3, it will be understood that the projection 49 remains in contact with the detent or lever 51 as the valve swings shut. When the valve reaches its closed position, the projection 48 will strike the fixed detent or stop 52, whereby on the tripping of the detent 51 at a subsequent stage in the operation the hopper is free to again drop, and the projection 48 being in contact with the fixed detent or stop 52 the valve V will of course be swung open as the hopper drops from its intermediate position (shown in Fig. 3) to that represented in Fig. 5, thereby to permit an accumulation of material in the hopper C to pass into the load-receiver G, as illustrated in Fig. 8.

On the emptying of the hopper when in its lowest position means will be called into action for returning or elevating the same to its primary position, such means in the present case consisting of an actuator supported independently of the weighing mechanism, such as the counterweighted lever 65, pivoted, as at 66, to the side frame 4 and shifted by the weighing mechanism, as will hereinafter appear.

The weight W of the beam B has pivoted thereto the link 67, having at its upper end the longitudinal loop 68, embracing the projection 69 on the weight 70 of the actuator or lever 65.

A rod is represented at 71, its lower end being pivoted to the inner end of the actuator or lever 65, said rod being preferably connected with the frame member 3 by the guide-link 72. The rock-arm 31, constituting a part of the chute-carrier, is furnished with the projection 73, which at certain stages in the operation of the machine is adapted to rest upon the free or upper end of the rod 71, which constitutes a convenient factor for transmitting the power of the actuator 65 to the hopper C for elevating the latter to its primary position.

At the commencement of operation, as shown in Fig. 2, the beam B and actuator 65 will be in their initial positions, the lower end of the loop 68 being in contact with the projection 69 on the actuator-weight 70, it being understood that the valve V has been previously opened to permit a stored supply of material therein to drop into the empty load-receiver. At this time the valve V and hopper C are maintained in such positions by the detent 50, situated under the projection 48, so that a stream of material from the stationary hopper H can pass through the hopper C to augment the supply of material discharged thereinto by said hopper C. When a certain quantity of material has been received by the load-receiver, it will descend, thereby elevating the weight W and consequently the weight 70 of the actuator 65, the rod 71 being simultaneously drawn downward and away from the projection 73 by the actuator.

When the beam B and actuator 65 have reached their extreme positions, as represented in Fig. 3, the actuator will be locked against retractive movement by a suitable device, as the latch 75, of ordinary construction, pivoted to the side frame 3 and counterweighted, said latch being adapted to engage the inner end of the actuator of lever 65. At a point just succeeding the engagement of the actuator 65 by the latch 75 the projection 61 will impinge against the lower end of the link 60, thereby swinging the detent 50 from under the projection 48, whereby the hopper C can drop to effect the shutting of the valve V and the cut-off of the supply-stream to the load-receiver, it being understood that during this period of operation the load-receiver G has received an overload of material. By reason of the sliding connection between the beam B and actuator 65 the beam can return to its normal position without affecting the actuator, which is locked in its shifted position, as specified.

When the load-receiver has received its overload, the load-reducing means will be called into operation, and when the surplus has been withdrawn the remainder in the load-receiver constitutes the true or predetermined load, and it will be discharged, preferably, into a suitable regulator. The load-reducing and load-discharging means will be hereinafter described.

The regulator in the present case is designated by E, and it consists of a hopper pivoted at 80 in the interior of the base 2, said hopper having the rearwardly-extending counterweighted arm 81, the counterweight 82 of which is intended to return the hopper to its highest position. (Shown in Fig. 2.)

The hopper E is situated below the load-receiver, and it is adapted to receive and to be depressed by the contents therefrom and to be held in its lowest position by the mass, the discharge-outlet 83 of the hopper being of reduced size to insure the retention of a sufficient amount of material for holding it down, as indicated in Fig. 4.

A connecting-rod is shown at 85 pivoted, as at 86, to the hopper E, the rod 85 being adapted to successively trip the latch 75 and the detent 51. The rod 85 has a by-pass-tripping device 87, whose function is to trip the actuator-holding latch 75. The by-pass-tripping device 87 being of ordinary construction a detailed description thereof is unnecessary.

The counterweighted arm 51″ of the detent 51 is furnished with a by-pass or switch 88, of usual construction, with which the shoulder or offset 89 at the upper end of the rod 85 coöperates. When the regulator E is lowered from its highest to its lowest position, (indicated, respectively, in Figs. 2 and 4,) the rod 85 will be drawn downward, the shoulder 89 and tripper 87 moving therewith and passing in contact and ineffectually by the by-pass 88 and the latch 75.

When the regulator-hopper E rises empty or comparatively so, the rod 85 will be thrust upward with the upper shouldered end 89 in contact with the by-pass or switch 88, thereby tripping the detent 51 and swinging the vertical arm of the detent from under the projection 49, as shown in Fig. 5, so that the hopper C is free to drop, and the projection 48 being in contact with the detent or stop 52 the valve V will of course be swung open, as illustrated in said Fig. 5. At a point immediately succeeding this action the by-pass tripping device 87 will strike and trip the latch 75, so that the actuator 65 is released. When the actuator 65 is released, the weight 70 will drop instantly, the rod 71 thereby being forced upward, and the upper end of said rod being in engagement with the projection 73 the rock-arm 31, and consequently the hopper C and valve V, will be elevated, the projection 48 during this action riding along the inner face of the working arm of the detent 50 until it reaches a point above the same, as indicated in Fig. 2.

The hopper C in connection with the valve V constitutes a suitable means for overloading the load-receiver G or delivering to the same a supply of material in excess of the predetermined load, the surplus being removed by suitable load-reducing means, which will now be described. The load-receiver G has near its lower end the spout 90, communicating with the interior of the load-receiver, and the inclined floor 91 of which leads toward the outlet of the load-receiver, the orifice of said spout being normally covered by a valve, such as V', oscillatory across the said orifice and pivoted, as at 92, to the load-receiver. The actuator for opening the load-reducing valve V' at the proper stage in the operation of the machine is designated by 93, and it consists of a counterweighted lever pivoted, as at 94, at one side of the closer L, said actuator or lever having at its lower end oppositely-disposed arms 95 and 96, the arm 95 being connected with the valve V' by the link 97.

When the load-receiver G has nearly reached the limit of its downward stroke, the free arm 96 of the actuator 93 will abut against the boss or stud 98 or other resistance device on the framework, as shown in Fig. 11, so that the actuator will be swung around its center and the link 97, and consequently the valve V', will be drawn downward, so as to permit the surplus from the load-receiver to pass through the spout 90 and enter the conduit 99, secured in the base 2.

In Fig. 9 the weight 93' of the actuator is represented as occupying its normal position, but when the arm 96 strikes the stud 98 on the framework said weight will be shifted to the opposite side of its center of movement until the arm 95 abuts against the fixed stop 94' on the closer, as shown in Fig. 10, whereby the valve V is maintained in its wide-open position to permit the gravitation from the load-receiver of the surplus. As soon as the material begins to pass from the load-receiver it, being lightened, will rise to release the closer. When the closer is released, it will be swung open, and the stop 94', by acting against the actuator-arm 95, as shown in Fig. 10, will shift the actuator-weight about its center and return it to its normal position and thereby simultaneously, through the link 97, shutting the valve V to stop the removal of material from the load-reducing spout 90, the valve, when it reaches its primary position, abutting against the stop 95' on the spout 90.

The tripper for the closer-holding latch is designated by T, it being of ordinary construction and pivoted to the side frame 3 and being adapted, on the ascent of the load-receiver and when the surplus is fully removed, to release the closer L by tripping the latch. When the load is discharged into the regulator E, it will be lowered, as hereinbefore set forth.

The operation of the hereinbefore-described machine, briefly stated, is as follows: Fig. 2 represents the positions occupied by the different parts at the commencement of operation, the closer being locked in its shut position by the latch 20' engaging the lever 21'. At this time the valve V will be wide open and the hopper C in its highest position, so that a stream of material from the fixed or stationary hopper H will descend to the hopper C and will enter the load-receiver. When a certain proportion of the load to be weighed has been received by the load-receiver G, it will descend, thereby elevating the weight W, and said weight, by reason of its connection with the actuator 65, will shift the latter, and when said actuator has reached its extreme position it will be engaged and held by the latch 75, as shown in Fig. 3. When the load-receiver has reached the end of its descending movement, the projection 61 thereon will impinge against the lower end of the loop 60, thereby drawing the same downward and swinging the detent 50 from under the projection 48, so that the hopper C and valve V are released, the hopper thereby dropping, and the projection 49 being against the projection 51 the valve V will be swung shut as the hopper drops, the projection 48 moving therewith and striking the fixed detent 52, as shown in Fig. 3, which thereby arrests the further action of said parts. At this time an overload is in the load-receiver G, and the surplus will be removed in the manner hereinbefore specified and discharged into the surplus receiver or conduit 99, following which the load-receiver G will rise. When the load-receiver rises, as hereinbefore set forth, the latch 20' will strike the tripper T on the framework, the latch thereby being tripped to release the closer, whereby the latter as it opens will, through the instrumentalities hereinbefore set forth, cause the valve V' to shut. The load from the receiver G is then discharged into the regulator-hopper E, which lowers the same, thereby drawing the rod 85 downward. When the hopper E is comparatively empty, it will be returned to its upper position by the dropping of the counterweight 82, the rod 85 being thrust upward so that the shouldered end 89 thereof can strike the by-pass 88 to trip the detent 51. When the detent 51 is tripped, as shown in Fig. 5, the hopper C can again drop, as hereinbefore set forth, so that the projection 48 being in contact with the fixed detent 52 the valve V will be swung open, and just succeeding this operation the by-pass tripping device 87 will strike the latch 75 to trip the same, thereby to release the actuator 65, so that the weight 70 thereof can drop to its primary position and raise the hopper, it being understood that during the operation of the regulator the closer L has been returned to its shut position and locked by the latch 20'. On the opening of the valve V the weighing operation will be repeated.

Having described my invention, I claim—

1. The combination of a hopper supported to have distinct stages of operation in the same direction; a device for controlling the discharge of material from said hopper; and means coöperative, respectively, with the hopper and said device for successively causing the operation of the latter on the series of movements and by the power of the hopper.

2. The combination of a hopper supported to have distinct stages of operation in the same direction; a device connected with the hopper for controlling the discharge of material therefrom; and means coöperative, respectively, with the hopper and said device for successively causing the operation of the latter on the series of movements and by the power of said hopper.

3. The combination of a hopper supported to have distinct stages of operation in the same direction; a device for controlling the discharge of material therefrom and pivoted to the hopper; and means coöperative, respectively, with the hopper and said device for successively causing the operation of the latter on the series of movements and by the power of said hopper.

4. The combination of a hopper supported to have distinct stages of descending movement; a device for controlling the discharge of material from said hopper; and means coöperative, respectively, with the hopper and said device for successively causing the operation of the latter on the series of movements and by the power of said hopper.

5. The combination of a hopper supported for reciprocation and also to have distinct stages of operation on its descending movement; a device for controlling the discharge of material from the hopper; and means coöperative, respectively, with the hopper and said device for successively causing the operation of the latter on the series of descending movements and by the power of said hopper.

6. The combination of a hopper supported to have distinct stages of operation in the same direction; a valve; and means coöperative, respectively, with the hopper and valve for successively causing the operation of the latter on the series of movements and by the power of said hopper.

7. The combination of a hopper supported to have distinct stages of operation in the same direction; a valve connected with the hopper; and means coöperative, respectively, with the hopper and valve for successively closing and then opening the valve on the series of movements and by the power of the hopper.

8. The combination of a hopper supported to have distinct stages of operation in the same direction; a valve; and means coöperative, respectively, with the hopper and the valve for successively causing the operation of the latter on the series of movements and by the power of said hopper; and means for returning the hopper to its primary position after its second period of operation.

9. The combination of weighing mechanism; a hopper supported for movement; a valve; means coöperative, respectively, with the hopper and valve for causing the operation of the latter on the movements and by the power of said hopper; a device mounted independently of the weighing mechanism and shiftable thereby for returning the hopper to its primary position; and a latch for holding the said device in its shifted position.

10. The combination of weighing mechanism; a hopper supported for movement; a valve; means coöperative with the hopper and valve for causing the operation of the latter on the movements and by the power of said hopper; a device mounted independently of the weighing mechanism and shiftable thereby for returning the hopper to its primary position; a latch for engaging said device when in its shifted position; a load-receiving regulator situated below the weighing mechanism; and means coöperative with said regulator for tripping the said latch.

11. The combination of a load-receiver; a scale-beam; a movably-mounted hopper; a valve; means coöperative, respectively, with the hopper and the valve for causing the operation of the latter on the movements and by the power of said hopper; an actuator supported independently of the weighing mechanism; a link pivoted to the scale-beam and having a loop at one end embracing a projection on said actuator thereby to shift the latter on the movement of the scale-beam; a latch for engaging said actuator when in its shifted position; and means for tripping said latch.

12. The combination of weighing mechanism; a regulator situated below the same; a movably-mounted hopper; a valve having arms furnished with projections; movably-mounted detents on which said projections are adapted successively to rest; and means coöperative, respectively, with the weighing mechanism and the regulator for successively tripping said detents.

13. The combination of a movably-mounted hopper; an arm connected therewith and provided with a projection; an actuator; a rod connected with the actuator, the upper end of said rod being adapted to engage said projection; means for shifting and for holding said actuator in its shifted position; a valve for the hopper, provided with an arm furnished with a projection; a detent on which said last-mentioned projection is adapted normally to rest, thereby to hold the hopper; and means for releasing said hopper.

14. The combination of a movably-mounted hopper; a valve for said hopper, having oppositely-disposed arms furnished with projections; a series of detents alternately disposed and adapted to be successively engaged by said projections, one of said projections being fixed to the framework and the others being movably mounted; and means for successively tripping said movably-mounted detents.

15. The combination of weighing mechanism including a load-receiver; a movably-mounted hopper provided with a valve having an arm furnished with a projection; a detent on which said projection normally rests; and a link connected with the load-receiver for tripping said detent.

16. The combination of a movably-mounted hopper having a valve; weighing mechanism including a load-receiver; an arm fixed to the valve, provided with a projection; a detent on which said projection normally rests and having an angular arm; a link pivoted to said angular arm and provided at its end with a longitudinal loop embracing a projection on the load-receiver.

17. The combination of a load-receiver; a counterpoise device therefor; a rocker movable about an axis transverse to that of the counterpoise device; and flexible straps connecting the rocker with the load-receiver and also with the counterpoise device.

18. The combination of a load-receiver; a scale-beam therefor; a rocker movably mounted about an axis transverse to that of the scale-beam; and flexible straps connecting the rocker with the load-receiver and also with the scale-beam.

19. The combination of a load-receiver; a counterweighted scale-beam fulcrumed against the framework; a rocker movable about an axis transverse to that of the counterpoise device; and flexible straps connecting the rocker with the load-receiver and also with the counterpoise of the scale-beam.

20. The combination of a load-receiver; a scale-beam therefor; and a rocker having journal portions at its opposite ends adapted to travel along a flat bearing-surface, said rocker having oppositely-disposed segments connected, respectively, with the load-receiver and the scale-beam by flexible straps.

21. The combination of a load-receiver; a scale-beam; a longitudinal shaft having journal portions adapted to travel along a flat bearing-surface on the framework; means for limiting the motion of the shaft; oppositely-disposed segments fixed to said shafts; and straps attached, respectively, to the segments and also to the load-receiver and scale-beam.

22. The combination of weighing mechanism including a load-receiver having a closer; a valve mounted on the load-receiver; and an actuator for said valve, supported for movement by the closer.

23. The combination of weighing mechanism including a load-receiver having a closer; a valve mounted on the load-receiver; and an actuator supported for movement by the closer and connected with said valve.

24. The combination of weighing mechanism including a load-receiver having a closer; a valve mounted on the load-receiver; and a counterweighted actuator for said valve, supported for movement by the closer.

25. The combination of weighing mechanism including a load-receiver having a closer; a valve mounted on the load-receiver; an actuator supported for movement by the closer; and a resistance device on the framework, adapted to be engaged by said actuator.

26. The combination of weighing mechanism including a load-receiver having a closer; a valve mounted on the load-receiver; an actuator for said valve, supported for movement by the closer; a link connected, respectively, with the valve and actuator; and means for operating the actuator.

27. The combination of weighing mechanism including a load-receiver having a closer; a valve pivoted on the load-receiver; a counterweighted actuator carried by the closer and provided with oppositely-disposed arms one of which is connected with the valve by a link; and a resistance device on the framework, adapted to be engaged by the other arm.

FRANCIS H. RICHARDS.

Witnessses:
F. N. CHASE,
ANDREW FERGUSON.